March 2, 1965 U. SCHALLER ETAL 3,171,587
SEALING STRUCTURES
Filed Jan. 12, 1962 5 Sheets-Sheet 1

INVENTORS
ULRICH SCHALLER
HANNS-DIETER PASCHKE
BY Norbert Ederer
ATTORNEY

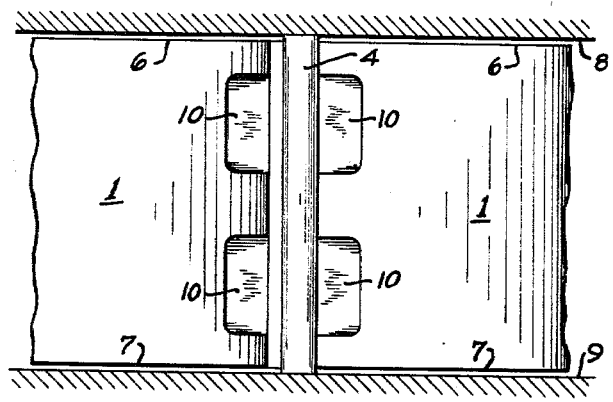
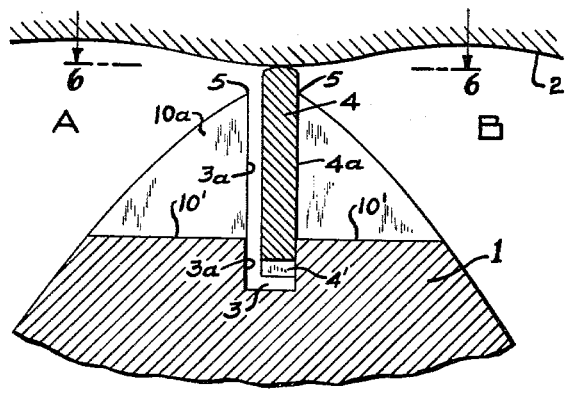
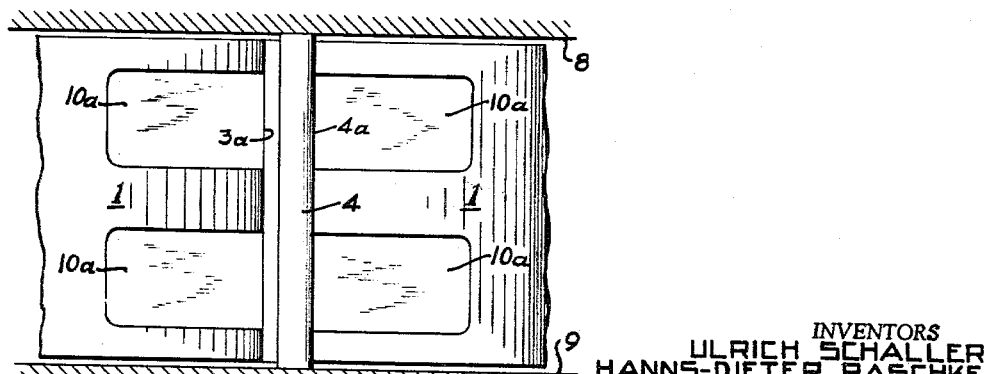

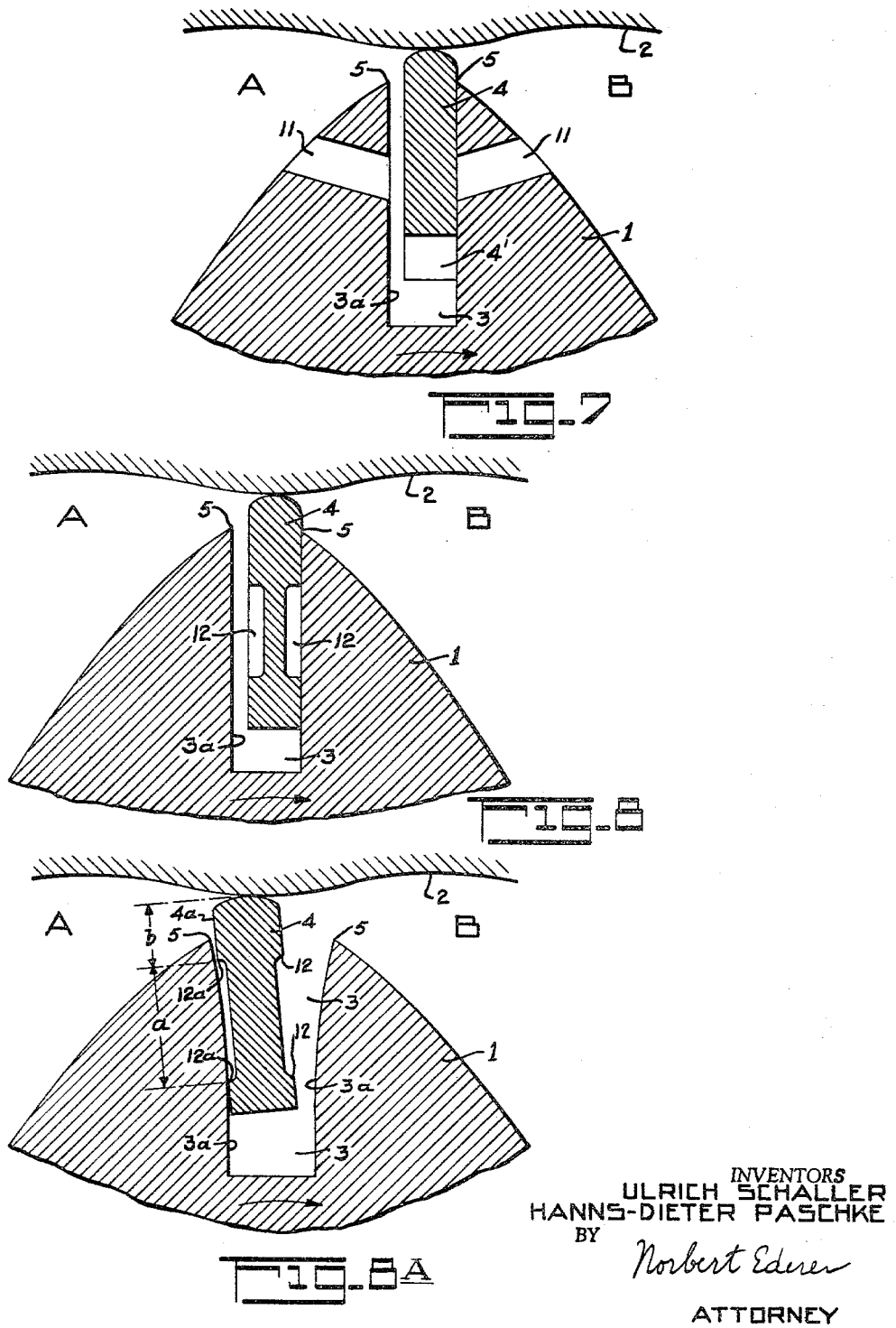

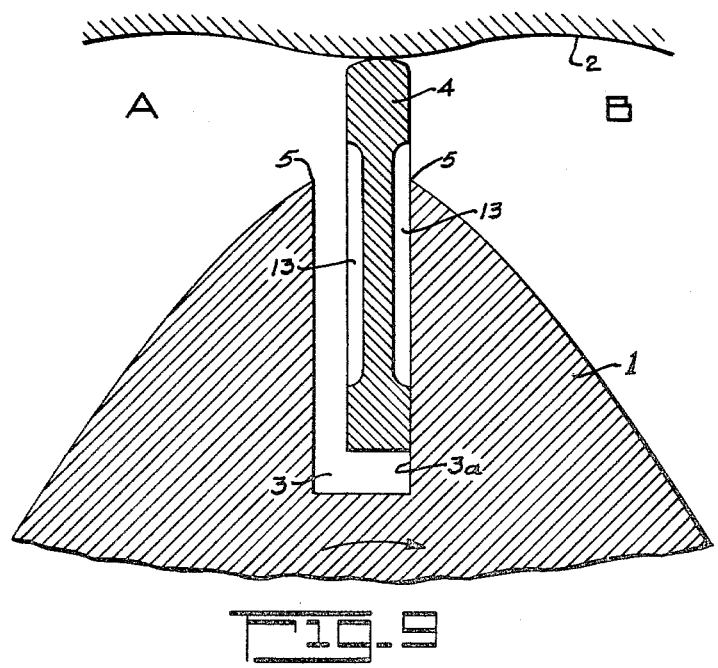
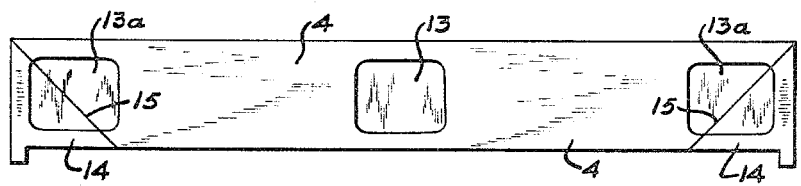
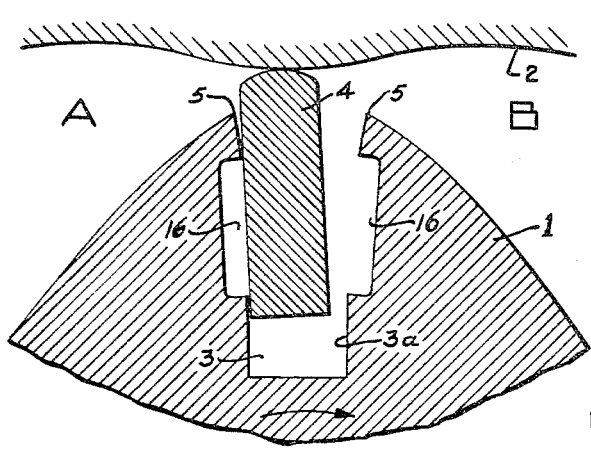

March 2, 1965 U. SCHALLER ETAL 3,171,587
SEALING STRUCTURES

Filed Jan. 12, 1962 5 Sheets-Sheet 5

INVENTORS
ULRICH SCHALLER
HANNS-DIETER PASCHKE
BY
Norbert Ederer

ATTORNEY

United States Patent Office 3,171,587
Patented Mar. 2, 1965

3,171,587
SEALING STRUCTURES
Ulrich Schaller and Hanns-Dieter Paschke, Neckarsulm, Wurttemberg, Germany, assignors to NSU Motorenwerke Aktiengesellschaft, Neckarsulm, Germany and Wankel G.m.b.H., Lindau (Bodensee), Germany
Filed Jan. 12, 1962, Ser. No. 165,896
Claims priority, application Germany, Jan. 21, 1961, N 19,462; Feb. 7, 1961, N 19,559
10 Claims. (Cl. 230—145)

This invention relates to sealing structures of the kind used in conjunction with rotary mechanisms, such as combustion engines, compressors, pumps, or expansion engines.

The invention is particularly useful in connection with rotary combustion engines similar to that disclosed in U.S. Patent No. 2,988,065.

Such a rotary combustion engine comprises an outer body having a cavity therein and an inner body relatively rotatable within said cavity, about an axis laterally spaced from but parallel to the axis of said cavity. The outer body has axially-spaced end walls and a peripheral wall interconnecting the end walls to form said cavity, the inner surface of the cavity peripheral wall having a multi-lobe profile which preferably is basically an epitrochoid. The inner body has end faces disposed adjacent to said outer body end walls for sealing co-operation therewith and has a peripheral surface with a plurality of circumferentially-spaced apex portions, each carrying a radially-movable seal for sealing engagement with the multi-lobe inner surface of the outer body peripheral wall to form a plurality of working chambers between the two bodies which vary in volume upon relative rotation of the two bodies. Each such apex seal of the inner body runs axially from one end face to the other of the inner body. The number of apices will usually exceed the number of lobes of the epitrochoid by one.

Each apex seal is seated in a slot or groove that is provided at the corresponding apex of the inner body, with play in both the radial and also the peripheral or lateral directions. Ideally, one or the other of the side surfaces of the seal should engage its confronting slot side wall with surface contact, depending upon the relative pressures prevailing in the adjacent working chambers. In other words, the seal disposition should be essentially radial. It has been found in practice that the seal tilts from the desired radial disposition, so that the contact between seal and slot side wall is reduced from surface contact to a line contact. Principal causes of tilting are unbalance of gas pressure forces on the side faces of the seal, as will be evident from subsequent consideration of FIG. 1, and bulging deformation of the slot side walls at operating temperature of the rotary combustion engine. Tilting of the seal leads to a number of undesirable effects, among which are the following:

(1) The effectiveness of sealing is substantially reduced.

(2) Gas leakage occurs between the working chambers, so that some fuel is not ignited and in that sense lost.

(3) The seal experiences radial and also lateral vibration as the seal transfers from one limiting, tilted position to the other in the course of an engine cycle.

(4) Such vibration results as a minimum in noisy engine operation and loss in engine power, and in the extreme may result in damage to the seal, the rotor (inner body), or the peripheral housing walls of the outer body.

It is accordingly a principal object of the invention to eliminate the disadvantages of previously known sealing structures.

A more specific object of the invention is provision of apex seals which maintain surface contact with their cooperating slot side walls even upon deformation of the latter.

A still further object of the invention is provision of apex seals that even under operating conditions are substantially free from tilting effects and vibration, so as to minimize noise, and seal and engine wear.

In accordance with the invention, it is proposed to expose susbtantial portions of the seal side surfaces to the gas pressures prevailing in the adjacent working chambers. Such pressure-exposed surface portions are situated within the apex slots, as distinguished from the portions which normally project radially from the slot so as to engage the peripheral wall of the outer body. The pressure-exposed areas communicate with the adjacent chambers via passages, which assume the form of cutouts in the seal or slot side walls, or bores through the rotor (inner) body, or in combinations thereof. By virtue of such pressure exposure, tilting moments are minimized, and the seal is urged to substantial contact with one or the other slot side wall, depending upon the relative pressures in the adjacent chambers.

Other novel features, and in particular specific preferred geometry for the pressure-exposed seal areas, together with further objects and advantages of the invention, will be evident upon consideration of the following more detailed description, of which the appended claims form a part, together with the accompanying drawings, in which:

FIG. 5 is a sectional view, and FIG. 6 the corresponding top plan view of a modification of the embodiment of FIGS. 3 and 4;

Figure 11:
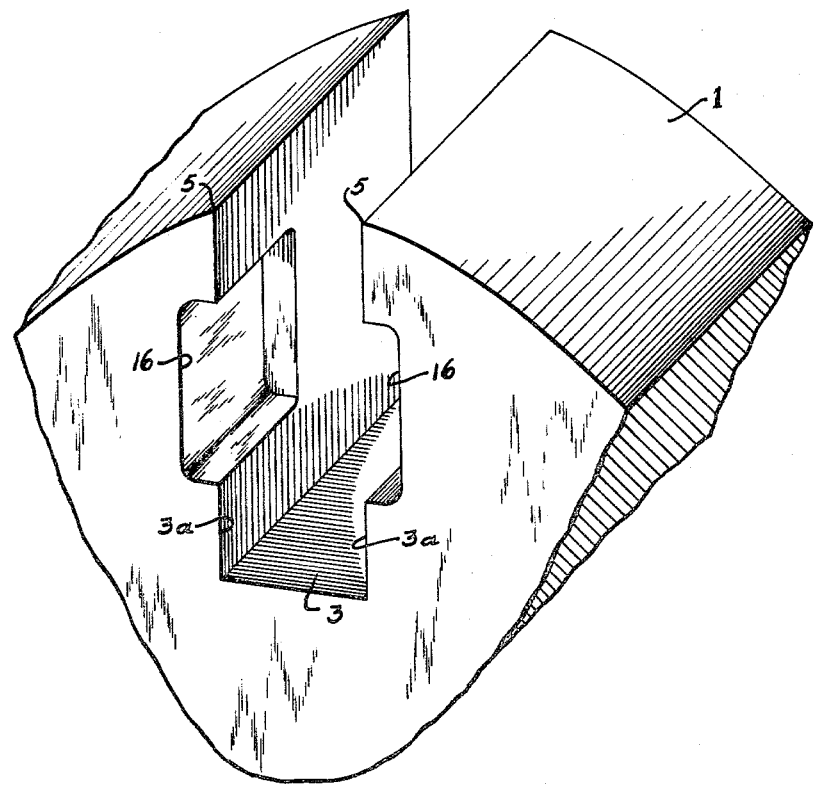

FIGS. 7, 8, 8a, and 9 are sectional views of apex seal structure according to other embodiments of the invention;

FIG. 10 is an elevational view of multi-part seal structure, utilizing the concept of the present invention;

FIG. 11 is an isometric view of seal structure according to a still further embodiment of the invention, and FIG. 11a is a sectional view of a modification of the arrangement according to FIG. 11.

In the drawings, the dimensions of some elements, particularly of the illustrated seals and their accommodating slots have been deliberately exaggerated in the interest of clarity. In the following description, it is arbitrarily assumed that the inner body is rotary and is therefore identified as rotor, and that the outer body, also referred to as the housing, is stationary. The inventive concept applies equally to arrangements where the relation of inner and outer body is inverted or where both bodies may be rotary, as explained in the mentioned Patent 2,988,065.

Figure 1:
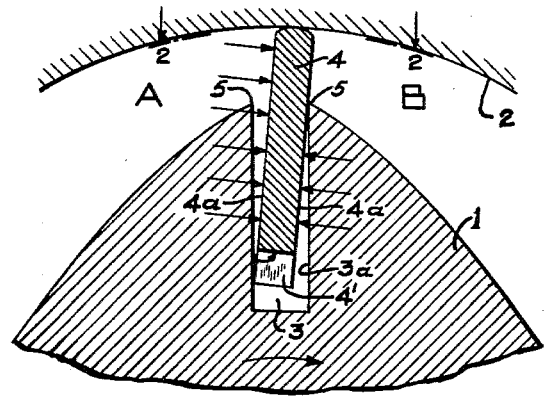
FIGS. 1 and 1a are sectional views of apex seal structure, illustrating the problems encountered with prior art approaches.
Figure 2:
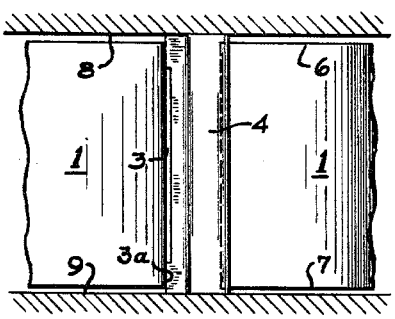
FIG. 2 is a top plan view of the structure of FIG. 1.

In FIGS. 1 and 2, there is shown an apex portion of a rotor 1 of a rotary combustion engine, which rotates eccentrically within housing 2. The profile of the housing may be in the shape of a two-lobed epitrochoid, in which case the rotor 1 will have three apices of the kind shown in FIG. 1.

Rotor 1 is provided with a radial slot 3, which extends axially to full width across the rotor body so as to define generally rectangular side surfaces 3a. Within the slot 3 is seated a sealing member 4 which has play in both the peripheral and radial directions, but it extends to full width in the axial direction so as to engage the housing end walls, as shown in FIG. 2. The seal 4 is provided with a pair of axially-spaced end legs 4' (see also FIG. 10), between which is seated a resilient member (not shown) which urges the seal 4 to sealing engagement with housing 2. In some of the subsequent illustrations, legs 4' are omitted for simplicity.

The several apex seals, in cooperation with rotor 1 and housing 2, define plural working chambers of varying volumes within the cavity in which the rotor rotates. Two such chambers are shown in FIG. 1 and are designated as A and B. The working chambers are subject to different gas pressures, and it may be assumed that chamber A is subject to the greater gas pressure. In the following description, it will be convenient to identify by A and B both the mentioned chambers and also the therein prevailing gas pressures.

The seal 4 is subjected to the pressures A and B beyond the outer surfaces of the rotor 1 at the following locations: above the upper (axially extending) edge lines 5 of the apex slot (FIG. 1) and in the gaps formed by rotor end wall 6 and housing end wall 8, and rotor end wall 7 and housing end wall 9 (FIG. 2). The latter gaps have limited depth, since the rotor end walls will be provided with end seals which extend in parallel relation to the edge lines of surfaces 6 and 7. The end seals have been omitted for simplicity; they may assume the form shown in the aforementioned Patent 2,998,065, for example.

In response to the excess of pressure A over pressure B, the seal 4 should ideally assume a position in which its right side surface 4a fully engages the right side surface 3a of the slot. The side surfaces 4a will be generally rectangular. As the rotor traverses through an engine cycle, the seal 4 should ideally reciprocate between this ideal position and an alternate ideal position wherein its left side surface 4a engages the left side wall 3a of the slot, depending upon which of the adjacent chamber pressures is greater.

Figure 1A:
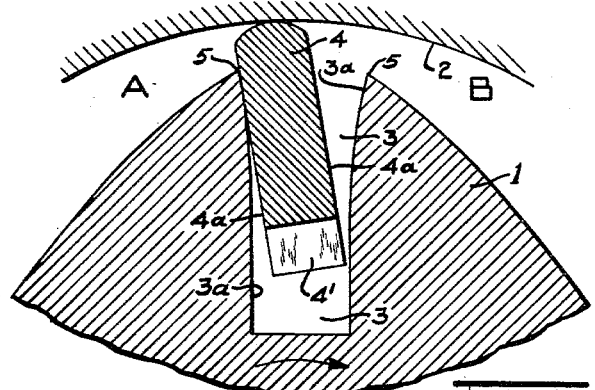

It has been found in practice that the seal 4 assumes the tilted position illustrated in FIG. 2 rather than the ideal position. This is so because the lower pressure B is not applied at a sufficiently large area. Gas at pressure A will pass through the space between seal end legs 4' to the opposite face of the seal, so that within slot 4 the seal is subjected to pressure A at both side faces. As a result, the engagement of seal and rotor is reduced to a line contact at its right edge 5 with the attendant disadvantages described in the introductory part of the specification. Initial tilting may be due to a variety of causes, for example a slight frictional binding effect between seal and housing, and, as soon as this occurs, the passage of gas at pressure A will render the tilt permanent, subject to possible reversal in tilt when chamber pressure B exceeds chamber pressure A. In FIG. 1a, wherein it is assumed that pressure B exceeds pressure A, the tilting effect is enhanced, owing to the illustrated bulging deformation of the slot side walls which occurs at elevated operating temperature of the engine.

As may be seen in FIG. 1a, owing to deformation of the rotor, there is a gap between right seal side wall 4a and right slot side wall 3a, through which gap gas at pressure B passes to the opposite side walls 3a and 4a, independently of the passage provided by end legs 4'. It should be noted that the line contact of seal and rotor at slot edge 5 of itself serves to deform the rotor body, and permanently so.

Figure 3:
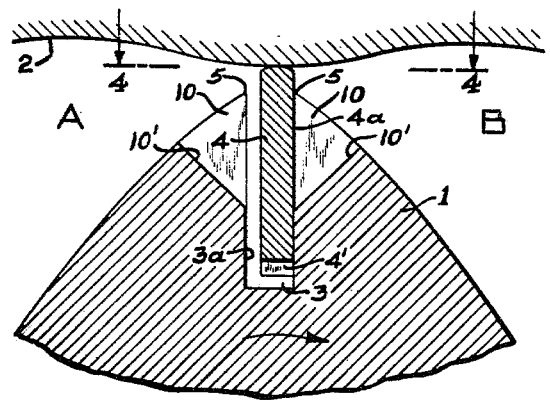
FIG. 3 is a sectional view, and FIG. 4 the corresponding top plan view of sealing structure in accordance with one embodiment of the invention.

FIGS. 3 and 4 illustrate one form of the invention by means of which tilting of the seal is avoided. In these, as well as in subsequent drawing figures, previously used reference characters identify like parts. In the arrangement according to FIGS. 3 and 4, the rotor is provided with a pair of cut-outs 10 which are bisected by and symmetrically located with respect to the axial extension of slot 3 and extend laterally therefrom in either direction. The cut-outs 10 are axially symmetrically spaced from end surfaces 6 and 7, and from one another, and have generally rectangular profiles. As may be seen by reference to FIG. 3, their radially inner limiting surfaces 10' are approximately normal to the rotor surfaces. The cut-outs are made of a size sufficiently large, so as to provide sufficient pressure communication with both chambers A and B so as to maintain the right seal side wall 4a in surface contact engagement with the right slot side wall 3a for the particular illustrated condition of pressure A exceeding pressure B. In the alternate situation of pressure B exceeding pressure A, the left seal side wall 4a will engage the left slot side wall 3a. The geometric symmetry of the cut-outs assures balanced application of pressure forces and precludes the possibility of moments tending to rotate the seal.

In the modification shown in FIGS. 5 and 6, the cut-outs 10a are similar to cut-outs 10 of FIGS. 3 and 4, except that the radially inner limiting surfaces 10' are made normal to the slot side walls 3a. This arrangement provides even greater pressure communication with chambers A and B.

In the embodiment illustrated in FIG. 7, pairs of bores 11 replace the cut-outs 10 of the embodiment of FIG. 3. The bores provide pressure communication with the chambers A and B and are again arranged in plural symmetrically disposed pairs.

In the embodiments of the invention so far described, the pressure communication passages to the adjacent chambers have been through the peripheral walls of the rotor. In the embodiment of the invention illustrated in FIG. 8, such communication takes place through the spaces between the rotor end faces 6, 7 and the end walls 8, 9 of the outer body with a symmetrically positioned pair of cut-outs 12 in each of the side walls of seal strip 4, the cut-outs being located within the slots and extending from the ends of the seal strip axially inwardly. Instead of plural symmetrical pairs, the cut-outs 12 may be arranged as a single pair and as such extend to full axial depth as shown in FIG. 8a. This arrangement is especially advantageous where substantial deformation of the rotor is anticipated. It is seen that even with such rotor deformation, substantial surface contact exists. Each of the left and right contacting surfaces 4a is comprised of two areas which are separated by the cut-out. FIG. 8a also illustrates relative dimensions of cut-out and contacting surface. Taking the radial length of the cut-out as $a$, and the radial distance from the interior end 12a of the outer contacting surface 4a to the housing wall 2 as $b$, the ratio $a/b$ should be greater than unity for optimum conditions of adequate pressure communication and assure surface contact of seal and slot side walls, the seal area exposed to pressure in the distance $a$ being greater than the area exposed in distance $b$.

FIG. 11 illustrates an alternative to the modification of FIG. 8, in that cut-outs 16 are provided in the side walls 3a in place of cut-outs 12 in the side walls of the slot. Here again the cut-outs communicate with the adjacent chambers via the spaces between the rotor end faces and the end walls of the outer body. In FIG. 11 only one pair of cut-outs 16 is shown for simplicity, but it should be understood that preferably a second pair of recesses should be provided in the opposite end wall. In FIG. 11a the cut-outs or recesses 16 are provided as a single pair and extend to full axial depth of the rotor by analogy to the embodiment of FIG. 8a. In the configurations of FIGS. 11 and 11a, the recesses 16 are radially inward of the apex. In FIG. 11a, by further analogy to FIG. 8a, the ratio of the radial cut-out length to radial length of that portion of seal side wall which is radially beyond the recess should exceed unity.

FIG. 9 illustrates a further variation of the embodiment of FIG. 8. Here the recesses 13 are again in the seal side walls rather than the slot side walls, but extend radially beyond the apex and therefore need not communicate with the end walls of the rotor. The recesses 13 are again symmetrically disposed with respect to the median axial plane through the seal 4 and should preferably also be symmetrical with respect to median planes through the seal transverse to the median axial plane. It should be noted that in the configuration of FIG. 9 as well as in the configurations of FIGS. 4, 6, and 7, plural pairs of recesses are not absolutely necessary; a single pair of recesses will suffice, even if such recesses do not communicate with the rotor side walls, so long as the recesses are of sufficiently large axial extension and are symmetrically spaced with respect to the rotor end walls.

FIG. 10 illustrates an application of the invention, and more particularly of the concept of the embodiment of FIG. 9, to an apex seal composed of plural parts. More particularly, the end portions 14 of the seal 4 are split from the main seal body along two oblique planes 15, so that the end parts 14 have a profile which is basically in the shape of an isosceles right triangle. This arrangement allows for expansion of the seal at operating temperature of the engine and assures positive engagement of seal and housing wall even upon such thermal expansion of the seal. For proper venting of the seal side walls to the pressure in the adjacent chambers, there is provided in each seal side wall a central recess 13 and additional recesses 13a located towards each of the ends. For proper realization of the objective of the provision of the split parts 14, it is desirable that the recesses 13a extend to both sides of the splitting planes 15. In this manner positive engagement of seal and housing and of surface contact of seal and slot side walls is assured even under conditions of extreme thermal expansion of the seal. Of course, the modifications of the invention other than that of FIG. 9 may be applied to the multi-part seal structure of FIG. 10, or combinations of previously described embodiments, and such combinations may also be effected with respect to single part seal structures.

From the foregoing description, it is seen that the objectives recited in the introductory part of the specification have been realized by provision of pressure communicating passages for the side surfaces of an apex seal of a rotary combustion engine of the described character. The pressure communicating passages assure that substantial portions of the seal side walls are exposed to the gas pressures prevailing in the adjacent engine chambers, and thereby assure substantial surface contact between seal side wall and apex slot side wall in avoidance of tilting of the seal.

While the invention has now been described specifically with reference to several disclosed embodiments, it should be understood that this invention is not limited to specific details of construction and arrangement thereof herein illustrated, and that changes and modifications may occur to one skilled in the art without departing from the spirit of the invention.

What is claimed is:

1. In a rotary mechanism of the kind having an outer body having axially-spaced end walls and a peripheral wall interconnecting the end walls to form a cavity having a longitudinal axis, an inner body disposed within said cavity and rotatable relative to said outer body about an axis spaced from but parallel to said cavity axis, the inner surface of said peripheral wall having a multilobed profile which is basically epitrochoidal, said inner body having end faces parallel to said end walls and having a peripheral surface with a plurality of circumferentially-spaced apex portions and having at each apex a slot running between said end faces and defined by a pair of generally radial side walls, an apex seal strip member disposed in each slot with play in the axial and circumferential directions and engaging the multi-lobed inner surface of said peripheral wall and said end walls in sealing relation to form a plurality of working chambers between the two bodies which vary in volume on relative rotation thereof, different respective working-fluid pressures alternately prevailing in said working chambers: the improvement comprising the combination of said inner body and seal strips wherein each seal strip has a pair of axially-extending side walls confronting the side walls of its slot, the major portion of the seal strip being disposed within the slot with only a minor portion projecting therefrom, said inner body and seal combination having in each apex region at least one pair of passages located one on each side of each apex seal and symmetrically disposed in relation to the axial extent thereof, said passages communicating continuously between the slot and the working chambers adjacent thereto and being of such size as to expose to the respective alternating pressures in the adjacent working chambers a larger area of the side walls of the associated seal within the slot than the area which projects therefrom to press the associated seal flat against the slot side wall opposite to the higher pressure chamber, said passages on the lower pressure side being occluded by the seal from the space between the slot bottom and the radially inner edge of the seal.

2. The invention according to claim 1 wherein the seal side walls are recessed in the circumferential direction, the recesses extending in the radial direction beyond the periphery of the inner body to form the aforesaid communicating passages.

3. The invention according to claim 1 wherein at least the axial end portions of the seal side walls are recessed in the circumferential direction to form the aforesaid communicating passages.

4. The invention according to claim 1 wherein in the slot side walls are recessed in the circumferential direction, the recesses extending radially to the periphery of the inner body to form the aforesaid communicating passages.

5. The invention according to claim 1 wherein the communicating passages are in the form of bores through the inner body running from slot side walls to adjacent peripheral walls of the inner body.

6. The invention according to claim 1 wherein the slot side walls are recessed in the circumferential direction, the recesses extending axially fully through the inner body to form the aforesaid communicating passages.

7. The invention according to claim 6 wherein the radial length of the recess exceeds the radial length of that portion of the seal side surface which is radially beyond the recess.

8. The invention according to claim 1 wherein the seal side walls are recessed in the circumferential direction, the recesses extending axially fully through the seal to form the aforesaid communicating passages.

9. The invention according to claim 8 wherein the radial length of the recess exceeds the radial length of that portion of the seal side surface which is radially beyond the recess.

10. The invention according to claim 1 wherein the seal member is in the form of plural parts split one from another, each such part being subject to the respective pressures prevailing in the adjacent working chambers via a communicating passage pair.

(References on following page)

References Cited in the file of this patent

UNITED STATES PATENTS

| | | |
|---|---|---|
| 127,943 | Wilson | June 11, 1872 |
| 720,993 | Allen | Feb. 17, 1903 |
| 1,087,181 | Pitman | Feb. 17, 1914 |
| 2,149,337 | Deming | Mar. 7, 1939 |
| 2,371,081 | Tucker et al. | Mar. 6, 1945 |
| 2,545,238 | MacMillin et al. | Mar. 13, 1951 |
| 2,719,512 | Kovach | Oct. 4, 1955 |
| 2,844,099 | Modrey | July 22, 1958 |
| 2,872,873 | Gardiner | Feb. 10, 1959 |
| 2,873,683 | Sherwood | Feb. 17, 1959 |
| 2,988,065 | Wankel | June 13, 1961 |
| 3,014,431 | Van den Bussche | Dec. 26, 1961 |
| 3,054,357 | McGill | Sept. 18, 1962 |
| 3,076,415 | Farron | Feb. 5, 1963 |
| 3,113,526 | Paschke | Dec. 10, 1963 |

FOREIGN PATENTS

| | | |
|---|---|---|
| 781,842 | Great Britain | Aug. 28, 1957 |
| 177,639 | Sweden | Dec. 19, 1961 |

OTHER REFERENCES

German application, 5,456, Dec. 1, 1955.